(12) United States Patent
Huang et al.

(10) Patent No.: US 10,277,538 B2
(45) Date of Patent: Apr. 30, 2019

(54) METHOD AND APPARATUS FOR CREATING BOOKLETS AND THE USE OF THE SAME

(71) Applicants: Brian Xing Huang, San Jose, CA (US); Shing Leung Luk, San Jose, CA (US); Shing Tung Luk, San Francisco, CA (US)

(72) Inventors: Brian Xing Huang, San Jose, CA (US); Shing Leung Luk, San Jose, CA (US); Shing Tung Luk, San Francisco, CA (US)

( * ) Notice: Subject to any disclaimer, the term of this patent is extended or adjusted under 35 U.S.C. 154(b) by 430 days.

(21) Appl. No.: 14/527,040

(22) Filed: Oct. 29, 2014

(65) Prior Publication Data

US 2016/0127283 A1  May 5, 2016

(51) Int. Cl.
*G06F 3/0484* (2013.01)
*H04L 12/58* (2006.01)

(52) U.S. Cl.
CPC .......... *H04L 51/046* (2013.01); *H04L 51/10* (2013.01); *H04L 51/32* (2013.01)

(58) Field of Classification Search
CPC .............................. G06F 3/0484; G11B 27/00
USPC .................................... 715/716, 720
See application file for complete search history.

(56) References Cited

U.S. PATENT DOCUMENTS

| 5,768,607 A | * | 6/1998 | Drews | G06F 3/0481 |
| | | | | 715/203 |
| 2004/0193428 A1 | * | 9/2004 | Fruchter | G06F 17/30259 |
| | | | | 704/276 |
| 2016/0370987 A1 | * | 12/2016 | Amerige | G06F 3/04883 |

* cited by examiner

*Primary Examiner* — Andrea C Leggett
(74) *Attorney, Agent, or Firm* — Joe Zheng

(57) ABSTRACT

Techniques for creating electronic messages with interactive images and audio are described. The electronic messages can be shared with another user or a group of users, published to a whitewall and iteratively commented in voice. According to one aspect of the present invention, an image is interactively marked while recording a spoken commentary to accompany marks provided by a user. A result of such a electronic message is referred to as a booklet herein.

20 Claims, 12 Drawing Sheets

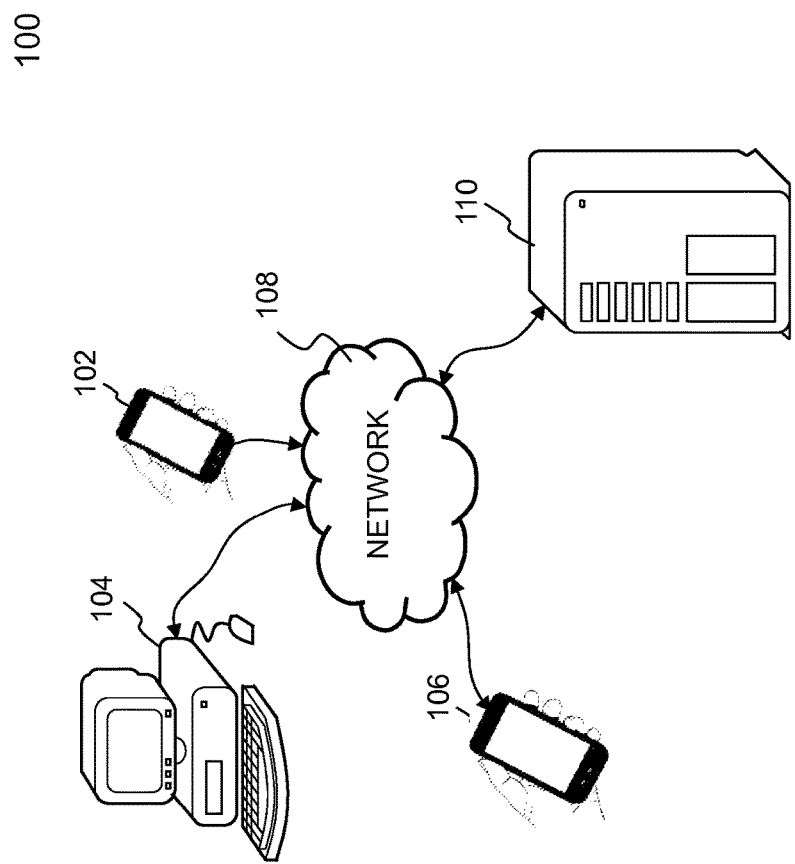

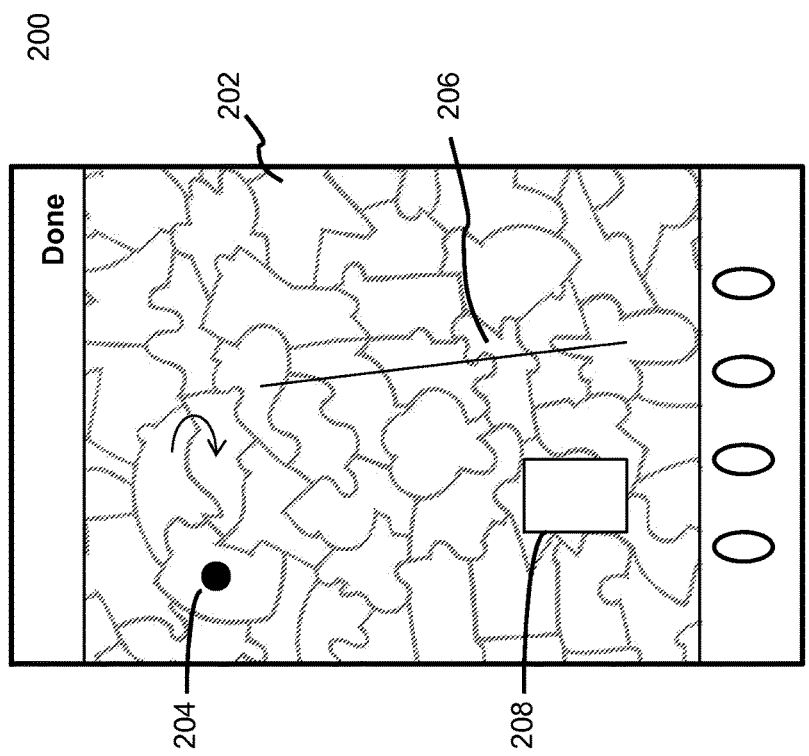

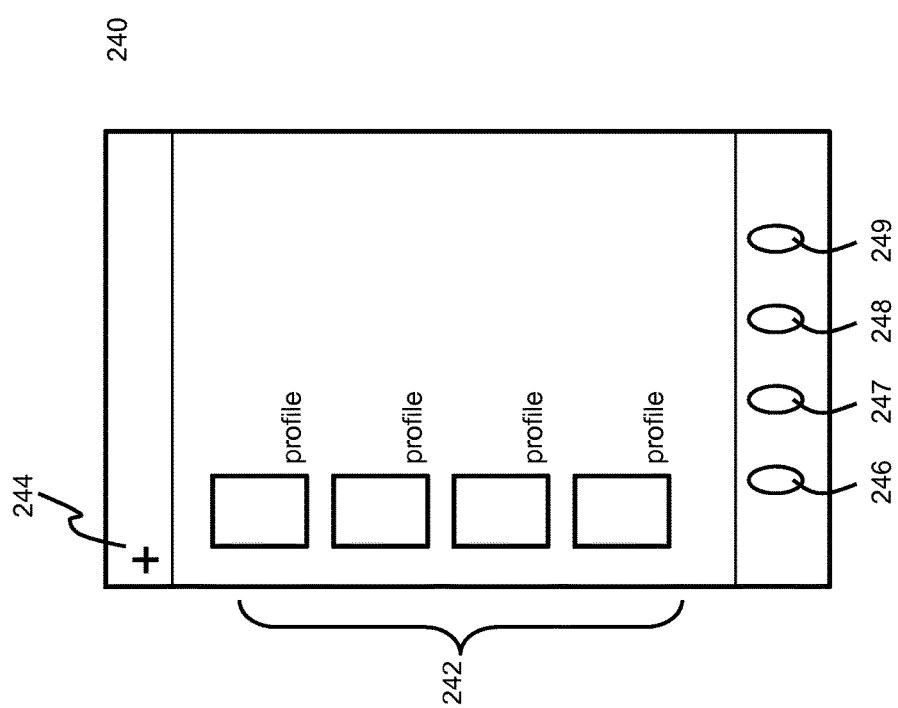

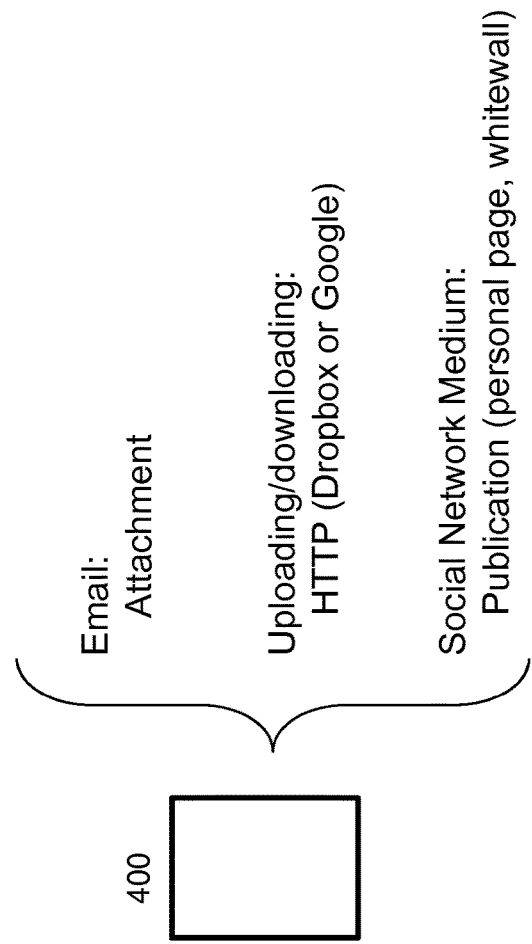

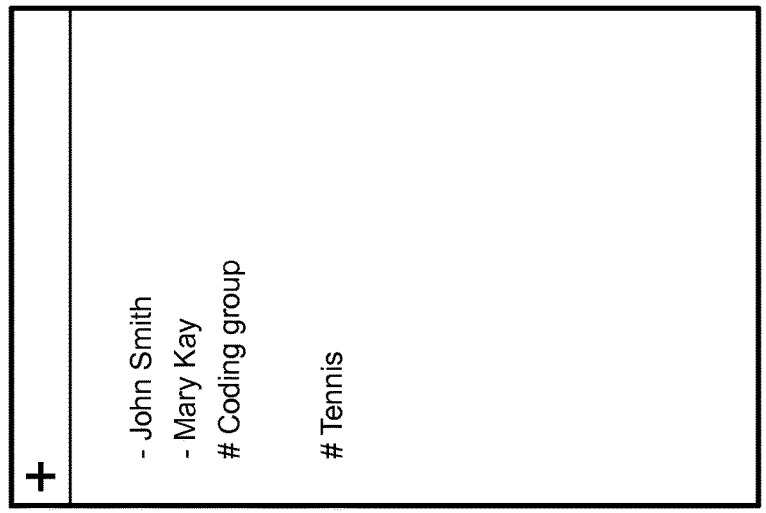

Version A — Authored by user A / Published on 1/2/2014

User A: I created a manual, let me know if the procedure is good to understand.

Version B — Authored by user A / Updated by user B / Published on 2/2/2014

User B: It looks good, I modified it a bit and added one image to detail some additional procedures

Version C — Authored by user A / Updated by user B / Updated by user C / Published on 2/8/2014

User C: it looks much better, I just added a precautionary note.

*FIG. 4D*

METHOD AND APPARATUS FOR CREATING BOOKLETS AND THE USE OF THE SAME

BACKGROUND OF THE INVENTION

Field of the Invention

The present invention is related to the area of man machine interface, and more particularly related to method and system for creating and updating a booklet with audio comments and marks, where the booklet may be shared with another user or among a circle of contacts over a data network (e.g., the Internet).

Description of the Related Art

The Internet is a data communication network of interconnected computers and computer networks around the world and has been rapidly evolving to the point where it combines elements of telecommunications, computing, broadcasting, publishing, commerce, and information services into a revolutionary new business infrastructure. The economy on the Internet is growing in every aspect of life, from buying small items (e.g., stationary) to big items (e.g., vehicles and houses) to trading stocks and ordering services, all via the Internet.

The Internet is being relied upon as a medium for various communications, including audio, video, email and fax. Communications may be conducted synchronously or asynchronously. Synchronous communication requires that both parties must be present at the time of the communication while asynchronous communication does not have such a requirement. For example, telephone is one type of synchronous communication while email is one type of asynchronous communication.

Asynchronous communication, including various discussion boards, blogging, and text messaging over the Internet, is becoming popular as it does not require both parties to be present when the communication takes place. Most of these asynchronous communication tools are meant to convey a subject or an idea in an electronic message. For example, as part of the asynchronous communication, electronic instructions provided by a business over the Internet can be accessed by a user whenever the user has time.

Such communication without two parties being present, however, requires clear and non-confusing expressions, otherwise a late-joined party would have no immediate way to clarify possible misunderstanding. In the domain of asynchronous communications, messages including images/video with audio are often used to illustrate a point or an idea. For example, www.youtube.com provides many installation guides in video and images. Unless it is a simple procedure involving few parts, an image-based instruction would not help much as an novice user sometime cannot even find a particular part in the image to follow along the instructions. Thus there is a great need for new ways to convey an idea in electronic message.

Further the current approach makes it very difficult, if not impossible, to modify what is received. For example, many businesses deliver electronic manuals to their customers (e.g., downloadable or in a CD). Although a manual can be accessed anytime, a consumer has to follow up a provided manual even when there are confusing instructions in the manual. The consumer has no way to help update the manual if he/she desires to do so. Thus there is another need for a mechanism for a recipient to modify what is received electronically. Other needs will become apparent upon examining the following detailed description of the present invention.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to creating electronic messages with interactive images and audio, where the electronic messages can be shared with another user or a group of users, published to a whitewall and iteratively commented in voice. According to one aspect of the present invention, one or more images are interactively marked while recording a spoken commentary to accompany marks provided by a user. A result of such an electronic message is referred to as a booklet herein.

According to another aspect of the present invention, such a booklet can be shared directly to a social network, where contacts of the author may view and provide further spoken commentary on the booklet, thus providing a collaborative platform for everyone involved in a project.

According to still another aspect of the present invention, whenever a booklet is updated, an updated version is deposited or published in a repository (e.g., a whitewall on a social network). As different users have modified the booklet over time, different versions are created and listed in an order and may be sorted according to when the versions were created, or names of those who have modified the booklet, lengths of the comments and etc.

According to still another aspect of the present invention, subject to the control by an author of the booklet, additional images may be iteratively added to, deleted from or modified in the booklet to enhance the objective of the booklet by the original author or other viewers.

The present invention may be implemented in software or in a combination of software and hardware, and practiced as a system, a process, or a method. According to one embodiment, the present invention is a method for providing a booklet, the method comprises: displaying an image on a display screen of a computing device being used by a user; determining if a microphone of the computing device is turned on; allowing the user to draw a mark on the image while recording a spoken commentary to accompany the mark; and creating the booklet with an interactive image including the mark and an audio track of the spoken commentary. In one embodiment, the mark is in different colors, sizes and forms selectable by the user. The method further comprises: capturing a progress of making the mark on the image so that a viewer sees how the mark is progressively made on the image when the booklet is viewed.

According to another embodiment, the present invention is a system for providing a booklet, the system comprises: a server configured to receive registration information of a user using a computing device to create the booklet, wherein the server communicates with the computing device configured to: display an image on a display screen; determine if a microphone of the computing device is turned on; allow the user to draw a mark on the image while recording a spoken commentary to accompany the mark; and create the booklet with an interactive image including the mark and an audio track of the spoken commentary.

According to yet another embodiment, the present invention is a mobile device for creating a booklet, the mobile device comprises: a display screen; a microphone; a memory space for storing an application module; a processor, coupled to the memory space and the display screen;

executed the application module to cause the mobile device to perform operations including: displaying an image on the display screen; determining if the microphone is turned on; allowing a user of the mobile device to draw a mark on the image while recording a spoken commentary via the microphone to accompany the mark; creating the booklet with an interactive image including the mark and an audio track of the spoken commentary; and capturing a progress of making the mark on the image so that a viewer sees how the mark is progressively made on the image when the booklet is viewed.

One of the objects, features, and advantages of the present invention is to provide interactive electronic messages for asynchronous or better communication.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1A shows a basic system configuration in which the present invention may be practiced in accordance with one embodiment thereof;

FIG. 2A shows a display of a mobile device, where the display is an example from which a booklet is created, according to one embodiment of the present invention;

FIG. 2C shows an exemplary initial display 240 when the application module is activated;

FIG. 2D illustrates a case in which a video is narrated, where a frame image is chosen to be narrated with;

FIG. 4A shows some examples of mechanisms that may be used to share a booklet over a data network;

FIG. 4B shows a display for sharing a booklet finished by a user;

FIG. 4D shows an example of various versions of a booklet being posted on a sharing medium (e.g., a whitewall) for all members to access.

DETAILED DESCRIPTION OF THE PREFERRED EMBODIMENTS

Figure 1B:
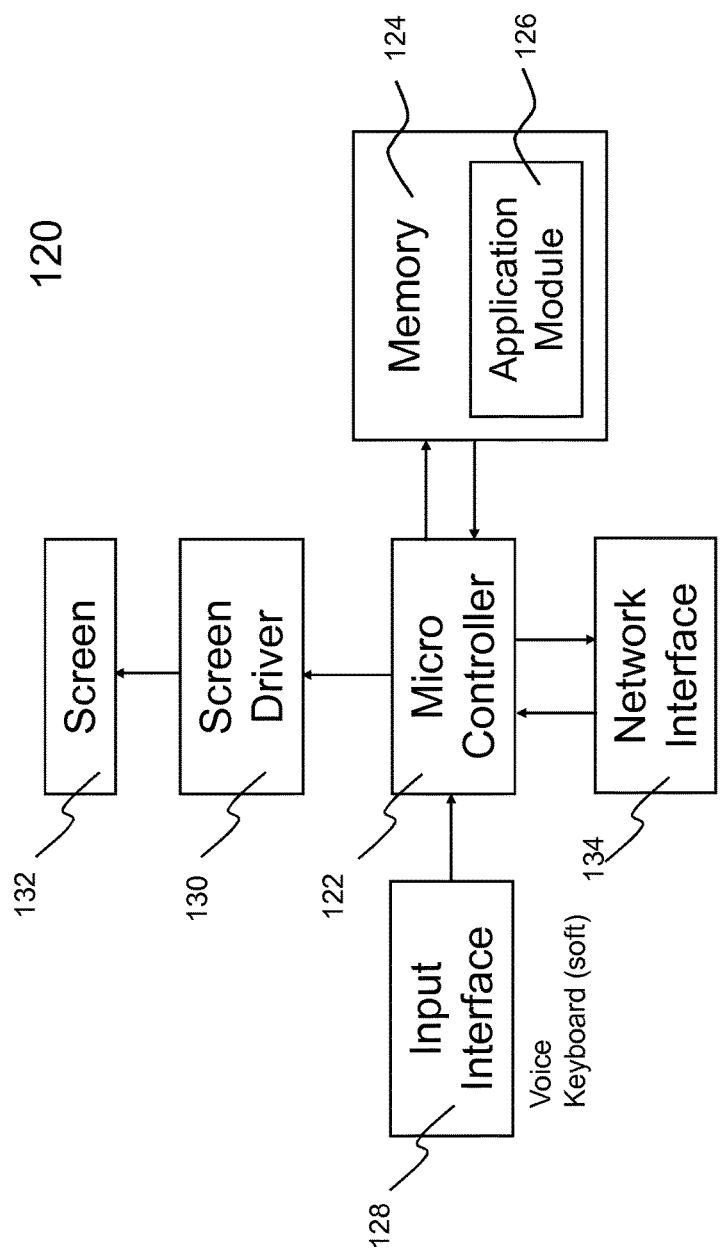
FIG. 1B illustrates an internal functional block diagram of a mobile device that may be used in FIG. 1A.

The detailed description of the present invention is presented largely in terms of procedures, steps, logic blocks, processing, or other symbolic representations that directly or indirectly resemble the operations of data processing devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The present invention pertains to a platform and an application each of which is designed to allow a user to convey his idea in an electronic booklet. As used herein, any pronoun references to gender (e.g., he, him, she, her, etc.) are meant to be gender-neutral. Unless otherwise explicitly stated, the use of the pronoun "he", "his" or "him" hereinafter is only for administrative clarity and convenience. Additionally, any use of the singular or to the plural shall also be construed to refer to the plural or to the singular, respectively, as warranted by the context. The booklet created to express the idea includes a visual message (e.g., one or more images, an video) that, whenever played back, provides interactive audio and visual effects for a viewer to grasp the idea without undue efforts. The booklet can be updated with comments from the viewer and the original author. One of the benefits, advantages and objectives in the present invention is to allow a user to create such a booklet using his mobile device and share it with a designated user or a group of selected contacts.

Referring now to the drawings, in which like numerals refer to like parts throughout the several views. FIG. 1A shows a basic system configuration 100 in which the present invention may be practiced in accordance with one embodiment thereof. FIG. 1A shows that there are three representative computing devices 102, 104 and 106, where the device 102 or 106 is meant to be a mobile device (e.g., a wearable device, a smart phone, a tablet or a laptop) while the device 104 is meant to represent a stationary device (e.g., a desktop computer). Each of the devices 102, 104 and 106 is loaded with a program or an application. In particular, one of the devices 102, 104 and 106 is used to create a booklet under the program. The device used to create the booklet is preferably to have a touch-screen display, as most of the mobile device does. Although other man-machine interfaces are possible, a touch-screen display provides the convenience for a user to mark a displayed image more effectively. After the booklet is completed, it can be shared with a designated user or a circle of contacts over the Internet 108.

According to one embodiment of the present invention, the booklet, if permitted, can be commented or updated by a viewer (a user to be shared with) on a device executing the program. Again the updated booklet can be further shared with others and commented or updated.

According to one embodiment, there is a server 110 provided to administrate the program and maintain user accounts. Each account is created to maintain a profile of a user, a latest version of a booklet created by a user or a booklet the user wants to archive. Depending on implementation, the server 110 is implemented to analyze the audio context of a booklet and/or profile of the booklet to extract some keywords. At a point, one or more corresponding advertisements are supplied to users that have viewed or archived the booklet.

Referring now to FIG. 1B, it illustrates an internal functional block diagram 120 of a mobile device that may be used in FIG. 1A. The mobile device includes a microprocessor or microcontroller 122, a memory space 124 in which there is an application module 126, an input interface, a screen driver 130 to drive a display screen 132 and a network interface. The application module is a software version representing one embodiment of the present invention, and downloadable over a network from a library (e.g., Apple Store) or a designated server.

The input interface 128 includes one or more input mechanisms. A user may use an input mechanism to interact with the device 120 by entering a command to the microcontroller 122. Examples of the input mechanisms include a microphone or mic to receive an audio command and a keyboard (e.g., a displayed soft keyboard) to receive a texture command. Another example of an input mechanism is a camera provided to capture a photo or video, where the data for the photo or video is stored in the device for immediate or subsequent use with the application module 126. The driver 130, coupled to the microcontroller 122, is provided to take instructions therefrom to drive the display screen 132. In one embodiment, the driver 130 is caused to drive the display screen 132 to display a photo or a video (referred to as an image or a sequence of images hereinafter). The network interface 134 is provided to allow the device 120 to communicate with other devices via a designated medium (e.g., a data network).

According to one implementation, the application module 126 is loaded in the memory 124 and executed by the controller 122 for a user to create a booklet. As will be further described below, the booklet is created under the execution of the application module 126, and enhanced/progressed with inputs from the user via the input mechanism 128. Once finished, the booklet may be shared with another user or a circle of contacts via the network interface 134. Meanwhile the device 120 may be used to receive a shared booklet from an original author or another user via the network interface 134. According to one embodiment, the shared booklet being viewed may be enhanced or updated with additional comments and again be shared with others via the network interface 134.

Figure 1C:
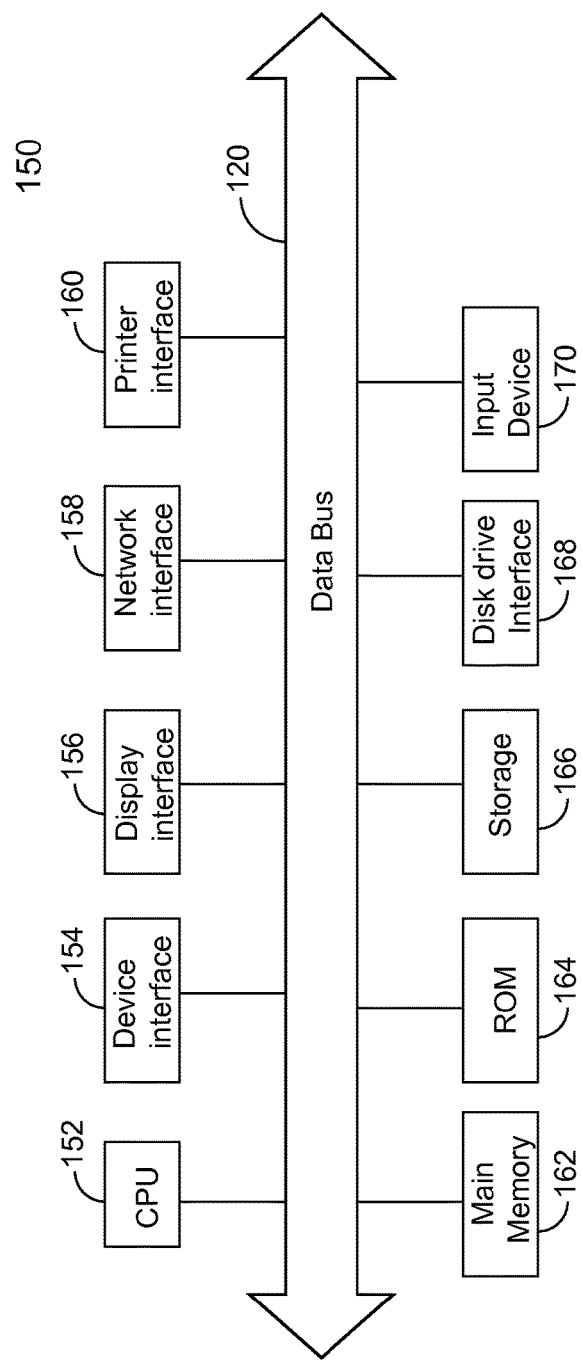
FIG. 1C is an example of a computing device that may be used in one embodiment of the present invention.

Referring now to FIG. 1C, it shows exemplary internal structure blocks of a computing machine 150 in which one embodiment of the present invention may be implemented and executed therein. The machine 150 may correspond to the computing device 104 or the server 110. The machine 150 includes a central processing unit (CPU) 152 interfaced to a data bus 153 and a device interface 154. The CPU 122 executes certain instructions to manage all parts and interfaces coupled to data bus 153 for synchronized operations. The device interface 154 may be coupled to an external device such as another computing machine to receive or share a booklet via a network interface 158. Optionally interfaced to the data bus 120 is a display interface 156, a printer interface 160, and one or more input devices 170, such as touch screen, keyboard, or mouse. Generally, a compiled and linked version or an executable version of one embodiment of the present invention is loaded into the storage 166 through the disk drive interface 168, the network interface 158, the device interface 154 or other interfaces coupled to the data bus 153.

The main memory 162 such as random access memory (RAM) is also interfaced to the data bus 153 to provide the CPU 152 with the instructions and access to the storage 166 for data and other instructions, applications or services. In particular, when executing stored application program instructions, such as a software version of one embodiment implementing the present invention, the CPU 152 is caused to manipulate the data to achieve results contemplated by the present invention. The ROM (read only memory) 164 is provided for storing invariant instruction sequences such as a basic input/output operation system (BIOS) for operation of all parts, interfaces and buses in the machine 150.

FIG. 1C is an example of a computing device that may be used in one embodiment of the present invention. It should be noted that not every module shown in FIG. 1C would have to be in a computing device in order to be used in one embodiment of the present invention. Depending on the configuration of a specific computing device, some or all of the modules may be used and sufficient in one embodiment of the present invention.

According to one embodiment, the machine 150 is used as a server device or server. A server module implementing one embodiment of the present invention is loaded and executed in the machine 150 (e.g., the server 118 of FIG. 1A) to manage various communications with individual devices running an application module, for example, to determine an interest of a user creating a booklet or receiving a booklet, to embed a proper advertisement in a booklet and various activities by a user with the application module. In one embodiment, the server is operated by a business entity and provides an electronic manual prepared according to the present invention. The electronic manual illustrates interactively how to perform a task in graphics with audio instruction.

According to one embodiment, a booklet provided to a general public (e.g., unknown users), the original author (e.g., a business entity) may lock up a version of the booklet so that no other viewers can modify the booklet. According to another embodiment, the booklet is partially locked so that only portions of the booklet may be interactively commented by a viewer. For example, a booklet is provided to illustrate how to install a device. When an installer follows the procedures in the booklet and notices that an extra step or precaution would make the procedures easier to follow, the installer is allowed to add a feedback comment or footnote somewhere on a related image in the booklet or even an image with more notes. Such comments or footnotes are made evident in the booklet that they are left or added in by viewers but not intended by the original author or the business that is distributing the booklet.

Referring now to FIG. 2A, it shows a display 200 of a mobile device. The display 200 is an example from which a booklet is created, according to one embodiment of the present invention. The display 200 shows an image 202 and allows a user to interact with the image 202. In operation, the image may be captured using a camera of the mobile device or retrieved from storage. Preferably, the image 202 is displayed on a touch-screen so that a user can simply finger touch the displayed image 202 to pinpoint an exact part that needs to be narrated or commented. FIG. 2A shows that the user has touched a point 202 on the image 202 to provide a spoken commentary to accompany the point 202. Depending on what the user has to say, the user may draw a line 206 or a figure 208 to associate with a comment made by the user.

A specifically designated display sign 210 (e.g., "Done") may be activated to end the narrative process by the user. Subsequently, a booklet including the image 202 accompanied by audio tracks is created, where the audio tracks are respectively synchronized or associated with marks made by the author.

Figure 2B:
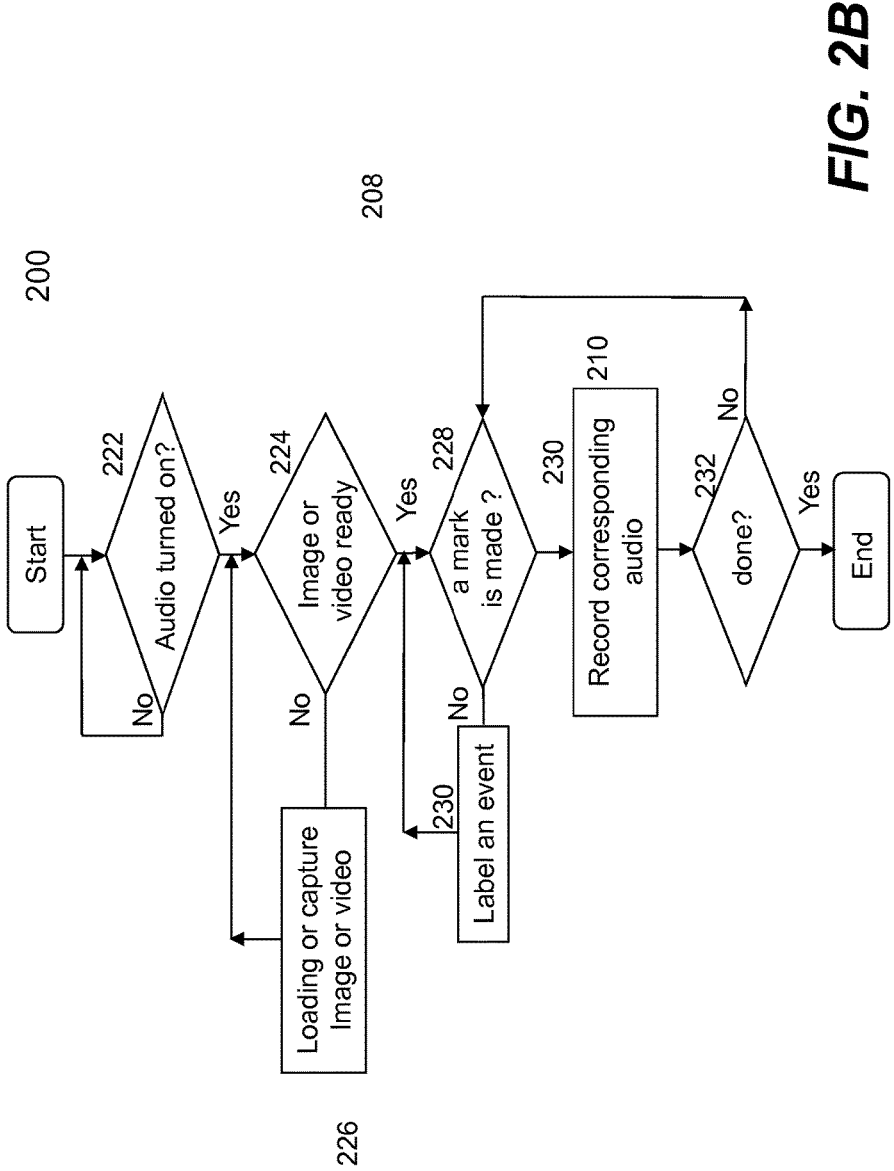
FIG. 2B shows a flowchart or process of creating a booklet by a user, according to one embodiment of the present invention.

Referring now to FIG. 2B, it shows a flowchart or process 220 of creating a booklet by a user, according to one embodiment of the present invention. Depending on implementation, the process 220 may be implemented in software or a combination of software and hardware. The process 220 is initiated when an application module implementing the embodiment is activated. FIG. 2C shows an exemplary initial display 240 when the application module is activated. The display 240 shows that there are some available booklets 242. Some of the booklets 242 may be previously created by the user while others may be obtained through sharing, namely a booklet was authored by someone else and is being currently shared. Depending on implementation, each of the booklets 242 may be highlighted in different ways to show the properties thereof.

In one embodiment, the property of a booklet shows when the booklet was created and by who. If the booklet has been updated by a second person, the property may also reflect who has accessed the booklet and when it was accessed and commented. The booklet records all authors, time and date, unless the original author locks the booklet. If locked, in one instance, the booklet will not be editable at all. In another instance a locked booklet will still be editable, but the name of the original author is removed if it is ever edited by another party. This removes a potential liability of the original author. According to another embodiment, the versions of a booklet are controlled. Regardless how many times a booklet has been edited, added or expanded, a specific version can always be recovered. In the case of an entity distributing a booklet that is editable, a viewer may always see the original version from the entity, even through the booklet may have been edited many times by different viewers.

The process 220 of creating a new booklet is started when a designated sign 244 (e.g. "+") is activated. The booklet may be named after a text being entered by the author. In one embodiment, the author is allowed an option to choose the orientation of the booklet. For example, the booklet may be created in portrait or landscape layout. At 222, the process 220 checks if the audio mechanism is turned on after an image or video is loaded. In the case of using a mobile phone, the mic is checked to see if the mic is turned on so that a voice can be captured when the user goes on to create the booklet. Optionally, the user may be asked to define how the booklet shall be oriented: portrait or landscape. This is a unique feature on a mobile device as a display screen on a mobile device may be viewed horizontally or vertically.

In one embodiment, there are a few displayed buttons, only four 246-249 shown as an example, one of which is designated to activate the audio function of the mobile device. The user may manually turn on the mic by activating the designated button. The process 220 then goes to 224, where the user is asked to present an image to be narrated with. If the image is already presented at 224, the process 220 goes to 228. If the image is not presented at 224, the process 220 goes to 226 to ask the user to either capture a life photo or retrieve one from a photo repository. In any case, the orientation of the presented image is automatically synchronized with the chosen orientation of the booklet. In the case that the original orientation of chosen photo is different from the chosen orientation of the booklet, the photo is automatically processed to fit the display screen.

In one case, the user may use a captured image stored in the mobile device. One of the displayed buttons 246-249 is designated to enable the user to browse a photo collection in the mobile device and then select one photo for the process 220 to continue. In another case, the user may activate one of the displayed buttons 246-249 to capture an image of a scene. Once satisfied, the captured image is loaded in for the process 220 to continue.

It should be noted, the image herein is meant to be a single image (e.g., a photo) or a sequence of images (multiple images or video). In the event, the user desires to narrate on multiple images, the loaded images are allowed to be viewed one by one so that the user makes audio comments on one or more specifically selected images.

Figure 2D:
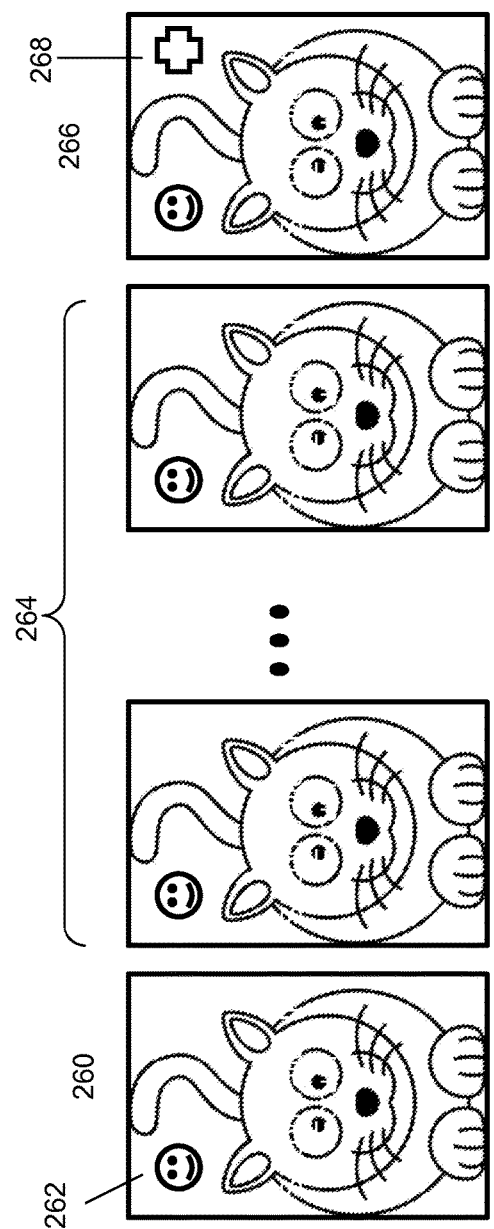

According to one embodiment, a video is selected. The process 220 is designed and configured to present images sequentially at a speed determined by the user. Normally much slower than the standard video rate, the user decides which image (frame) is to make a mark and narrated with the mark. Since adjacent images in video are substantially similar, the mark is automatically carried on subsequent images till the user stops according to one embodiment. FIG. 2D illustrates a case in which a video is narrated. When a frame image 260 is chosen to be narrated with, the user make a mark 262 on the image 260. The mark is automatically carried on in the subsequent frame images 264 till another frame image 266 is chosen to be marked with a mark 268. According to another embodiment, a video is loaded and played back normally while the user is narrating along the playback. Whenever the user draws a mark on the video, a frame image is started with the beginning of the mark, the subsequent frame images carry the progress of making the mark on the video by the user. As a result, the drawing process is presented when the booklet is played back.

In any case, after an image is presented, the process 220 now goes to 228, where the user is able to make a mark on the image and provide a spoken commentary to accompany the mark. As described above, the mark may be anything that changes the viewing of the image. For example, a typical mark is a visual sign or drawing a user wants to do with the displayed image. An example of the drawing may include a dot, an arrow, and a circle. The mark may be presented in different widths or colors. A mark may be chosen from a palette or drawn in anyway preferred by the user. In the case that the mark has a progressive trace (e.g., a drawing along or around a chosen part in an image), the trace will be shown when the booklet is viewed or played back.

Other example of a mark may be a sound, a vibration or flashing of the displayed image. In one embodiment, besides drawing a sign on a displayed image and accompanying an audio comment, the author may want to further catch the attention of a user by adding a sound from a mobile device, causing the mobile device to vibrate or the displayed image to flash (e.g., changing the brightness or colors sharply). It is known to those skilled in the art that many mobile devices (e.g., iPhone) include a set of default and downloaded ringtones or music, any of those could be used as a special sound to the displayed image in a booklet. In one embodiment, a link may be embedded to bring a user to a designated website. Similarly, when one of the images is viewed, the mobile device is automatically set to vibrate, change image tones, or play back a sound.

If a mark is not made, the process 220 goes to 230 that is not to keep the mic of the mobile in active. The mic of the mobile device is activated for narration in creating a booklet after a mark is made to the display image. While or after the mark is drawn or placed on an image, the process 220 goes to 232, the user can now make an audio that is associated with the mark. The audio track is always attached to the mark. In playback as further described below, all the marks are sequentially displayed, the corresponding audio tracks are also sequentially played back. In one embodiment, all marks can be removed while recording to clear the image of drawings and then new marks can be made. To clear the drawings, there can be numerous gesture commands. For example, touching with 2 fingers will erase all drawings, but keep the recording going, so the author can circle and erase things while the recording is still happening and can do that quickly.

Optionally, a user is able to make as many marks as needed. The process 220 is repeated between 228 and 234 till the user is done with all the marks or comments he needs to make as far as the image is concerned. The end result of the process 220 is a booklet. There are many applications for such a booklet created in accordance of the present invention. One application of the booklet is for a business to provide its customers with installation guides. Another application is related to online education. Yet another application is for a user to share with his contacts something more illustrative through a personally created booklet.

Figure 3:
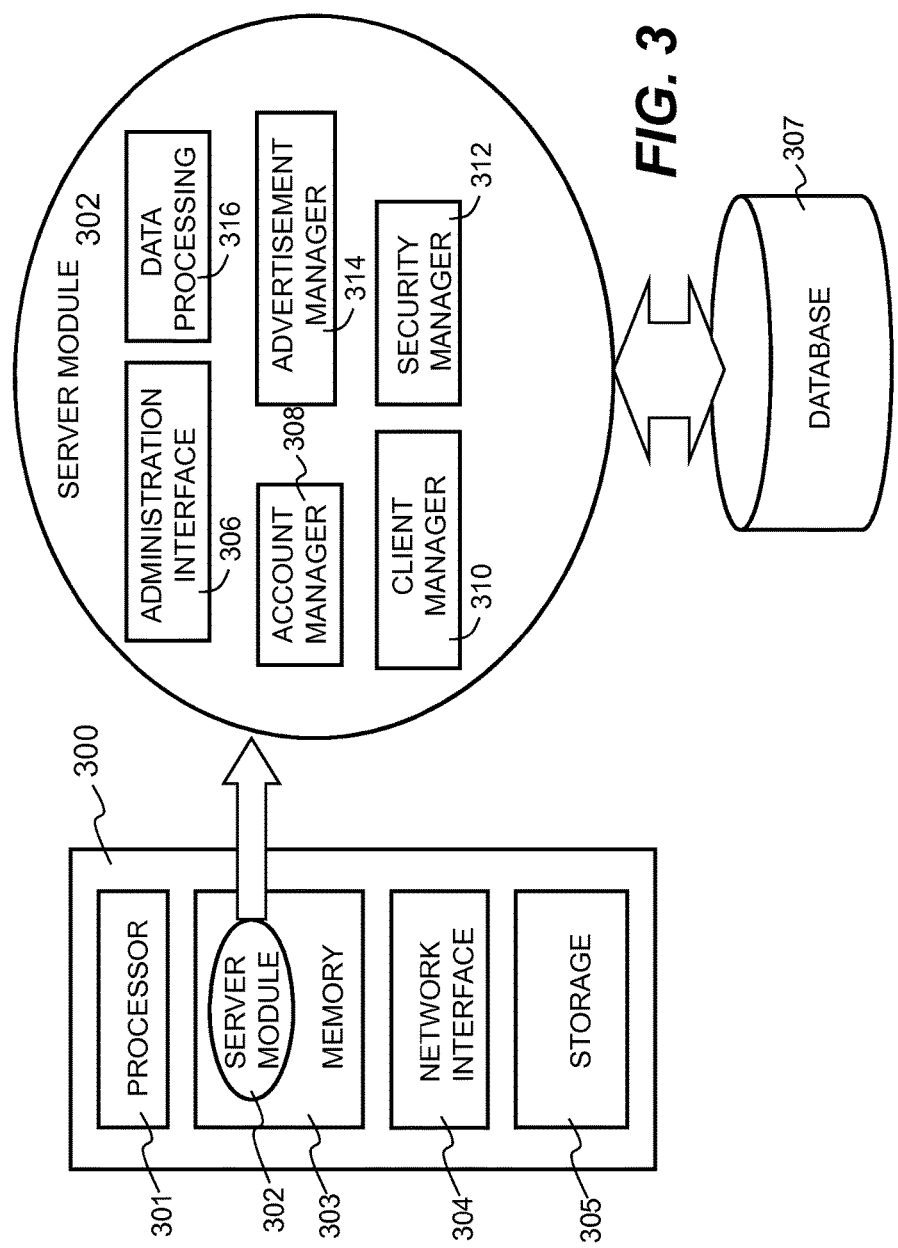
FIG. 3 shows a functional block diagram of a server machine or server in which a server module resides in a memory space and is executable by one or more processors.

Referring now to FIG. 3, there is shown a functional block diagram of a server machine or server 300 in which a server module 302 resides in a memory space 303 and is executable by one or more processors 301. The server 300 may be used in FIG. 1A to provide administration of the applications or programs that have been downloaded or distributed in various computing devices. Depending on implementation, this server 300 may be a single server or a cluster of two or more servers. One embodiment of the present invention is implemented as cloud computing in which there are multiple computers or servers deployed to serve as many businesses or individuals as practically possible. For illustration purpose, a representative of a single server 300 is shown and may correspond to the server 110 in FIG. 1A. It shall be noted that the process 220 works independently but can be enhanced when working with the server 300.

The server device 300 includes a network interface 304 to facilitate the communication between the server device 300 and other devices on a network, and a storage space 305. The server module 302 is an executable version of one embodiment of the present invention and delivers, when executed, some or all of the features/results contemplated in the present invention. According to one embodiment, the server module 302 comprises an administration interface 306, an account manager 308, a client manager 310, a security manager 312, an advertisement manager 314, and a data processing module 316.

Administration Interface 306:

As the name suggests, the administration interface 306 facilitates a system administrator to register a user (e.g., an individual or a business entity) and grant certain controlled services to the registered users. Examples of the controlled services may include version controls on additive marks by a viewer and/or additive comments on the original audio track, and distribution of a created booklet without embedded advertisements. In one embodiment, the administration interface 306 allows a service provider to manage all subscribing accounts and determine what and how much to charge for a service. In one example, several businesses can create an account within Booklet (for a fee). Users can search for businesses just as they would search for a friend. Businesses that have paid will have their certificates of authenticity and be at the top of the search engine. Users will want to search for the businesses to download their booklets (such as restaurant menus or device instruction books). The businesses can create their advertisements within the book-let. Businesses will want to sign up in order to be relevant within the booklet community. Users will want to find businesses in order to access the useful booklets (cooking recipes, how-to guides, vacation booklets, SAT vocabulary booklets for students, homework solutions from teachers, dental procedures, medical operation basic details, etc.). Users may be given the option to "follow" a certain business to help increase popularity of the business. The popularity of a business can be displayed by some sort of indicator such as the number of subscribers.

Account Manager 308:

The account manager 308 is provided to allow a user to automatically register himself with the server 300 for a service being offered by the server 300 or register with the module running on his computing device. In one embodiment, a user causes the module to be executed for the first time on his device (e.g., iPhone), the module is designed to request the user to enter certain information (e.g., a user name, a true name, etc.) before allowing the user to create a booklet or view a booklet. After the registration, a profile of the user is created and then transported to the server 300. Although the module provides basic functions to create a useful booklet, there are additional features that are only provided to a paid user. As indicated above, after a fee payment, a subscribing user may be granted to create a booklet that can be further commented by another, marks in which may be further enhanced to be more illustrative, and/or distributed with certain control without advertisement. According to one embodiment, the account manager 308 indicates to the server 300 that a user who chose not to pay for a service being offered by the server 300 may view certain advertisements selected in accordance with a profile of the user, where the advertisements are embedded with a booklet created by the user. Depending on implementation, the advertisements may be correlated at a level with the content of the booklet and/or the audio track by the user. Essentially, the account manager 308 is configured to maintain all registered users (paid or free users).

Client Manager 310

The client manager 310 is provided to manage versions of the applications provided to the registered users. In one embodiment, there are two versions, one for paying users and the other for non-paying users. The paid version is designed to have more functions than that of the free version. For example, a free version of the module (i.e., a client module) allows a user to create a booklet of certain length (e.g., 5-minute and one audio track) while a paid version of the module allows a user to create a booklet of any length. Working with the account manager 308, the client manager 310 is configured to release a proper version of the module to a registered user.

Security Manage 312

This module is configured to provide security when needed. The stored data for each of the subscribing businesses or users may be encrypted, thus only authorized user may access the secured data. In some situations, an encryption key to a secured booklet is securely maintained and may be retrieved by a system administrator to access a secured booklet in case there is a need. In one embodiment, the security manage 312 is configured to initiate a secure communication session with a client machine when it detects that a registered user accesses a file (i.e., a booklet) remotely over an open network.

Advertisement Manager 314

The advertisement manager 314 is a tool provided to select one or more advertisements to be embedded in a booklet, where the advertisements are chosen based on certain criteria. Depending on implementation, the criteria may be based on a profile provided by the user or a profile retrieved from a social network where the user shares his created booklet with his contacts). In one embodiment, the criteria is based on the content of the booklet or the narrations therein.

Data Processing 316:

This module is configured to perform data operations to determine an interest of the users. According to one embodiment, certain social network pages (e.g., facebook) owned by a user are crawled to determine an interest of the user so that the advertisement manager 314 can determine an appropriate advertisement for the user. In operation, data obtained from the user (e.g., his profile or data of his personal pages) are analyzed to determine what interest the user may have. When there is a call from the account manager 308 that one or more advertisements shall be served to the user, either embedded in a booklet maintained in his account at the server 300 or pushed to a device running the client module to author a booklet let or view a booklet shared by others, the data processing 316 sends its finding to the advertisement manager 314 to determine the advertisements.

In general, the server 300 is configured to provide services at different levels to registered users. In one embodiment, the server 300 allows a user to organize all booklets he has maintained. These booklets may be those originally created by the user, those shared by contacts in a group and those downloaded from the Internet. These booklets may be categorized by the user from a computing device coupled to the server 300. In one embodiment, the server 300 is configured to execute a server application substantially similar to the application module 126 of FIG. 1B. A registered user is able to create, view or modify a booklet remotely from a computing device not necessarily installed with the application module 126 of FIG. 1B.

Referring to FIG. 4A, it shows some examples of mechanisms that may be used to share a booklet over a data network. When a user completes a booklet, one embodiment of the present invention allows the user to share the booklet with someone or a group of his contacts. As shown in FIG. 4A, the booklet may be shared with someone by email, in which case the booklet may be attached to an email to someone. When the recipient has never used or downloaded a client module in his computing device, his attempt to view the booklet prompts him to download the client module from a designated site (e.g., Apple Store or a website). After registration, the user becomes a registered user. Once a booklet is received and selected, the user may view it by activating a designated button, which allows the user to view the booklet to the end. Optionally, the user may activate another designated button which allows the user to modify/update the booklet while viewing the booklet.

Similarly, the booklet may be saved or uploaded in a repository (e.g., a shared file folder, a store, or a website). Users with proper privilege or in a working group can download the booklet for viewing on their own machines.

Another sharing of the booklet is via a social network medium (e.g., facebook). According to one embodiment of the present invention, the client module is designed to associate it with an account of a social network. it is not intended to imply any limitation herein, the following description is based on Facebook (www.facebook.com). In other words, a user may sign in the client module with his Facebook account. In one embodiment, one of the buttons in FIG. 2C or a designated softkey on another display is provided to allow the user to publish a finished booklet on his personal page or a whitewall being shared by a group of (Facebook) users who may be working on a project or sharing a common interest.

FIG. 4B shows a display for sharing a booklet finished by a user. It is assumed that the user has created his own account using the credentials he normally uses for his account at Facebook or a link to the Facebook account has been previously established when he established his account for creating/accessing booklets. The display of FIG. 4B shows a list of available individuals or groups on Facebook that the user has in his contact circle. This list is downloaded from his Facebook account into the client module being executed. In other words, the client module is configured to communicate with the Facebook website and capture all relations the use has with other users on the Facebook website.

The display of FIG. 4B shows that there are individuals and groups. The individuals represent those contacts that the user can communicate with mutually while the groups represent individual groups the user is a member thereof. In one embodiment, the user is allowed to select who he wants to share the booklet with. By clicking a designated area (e.g., + sign), the user may add a recipient (e.g., from his local address book) to receive the booklet. Once the selection is made, the booklet is transported to those users. When the recipient is an individual, the booklet is sent to the recipient privately. Similar to a message exchange, the booklet will be seen when the intended recipient logs into his/her Facebook account. When the recipient is a group, the booklet is published to a sharing medium (e.g., a whitewall). Anyone online in the group will see the posting of the booklet.

The booklets are locally organized in the client module. Depending on implementation, anyone of the booklets, when selected, can be readily transported directly or via a server to the Facebook website for sharing or publication. When a user or a member in a group who has never used such a booklet desires to access the published booklet, the user would have to get a copy of the client module and become a registered user, thus populating the use of the client module.

Figure 4C:
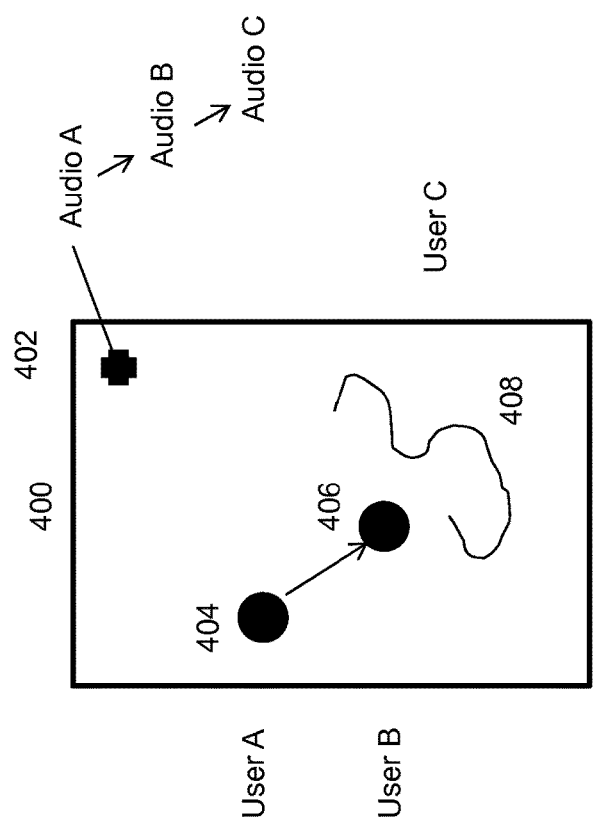
FIG. 4C illustrates the booklet that has been viewed by user B and user C; after the user B has made comments on the audio by user A, the booklet being shared is updated.

It is assumed that anyone who desires to access a published booklet has one copy of the client module in his device. When a booklet authored originally by user A, referred to as Version A, is viewed by user B, the viewer user B is allowed to narrate over the audio by user A to create an audio B, thus creating Version B. FIG. 4C illustrates the booklet 400 that has been viewed by user B and user C. After the user B has made comments on the audio by user A, the booklet being shared is updated to be Version B. When user B publishes the booklet Version B, the portal or white wall is designed to retain all of the versions as shown in FIG. 4D so that a viewer may see how the booklet has been modified over time and may choose a particular version. The versions may be sorted according to specified criteria (e.g., names, dates, lengths or number of modifications.

According to one embodiment, user B modifies Version A on his device and then publishes a revised version (Version B) by sending a copy to a user (e.g., user A) or publishing it back to where the previous version was located (e.g., a Facebook page).

When user C has accessed the published booklet and made a further comment over audio A and audio B, respectively by user A and user B, audio C is created in the booklet, hence Version C. Again user C publishes the twice-updated booklet Version C. Now on a white page, users may see three versions of the booklet, chronically listed and available for access as shown in FIG. 4D. Users in a group may also exchange messages besides the booklet or its subsequent versions.

FIG. 4C further shows that user B and user C have made additional marks to illustrate their comments. In particular, user B has modified the mark 404 by user A to mark 406 while user C has added his own mark 408. When user B viewed the booklet published by user A, user B modified the mark to, perhaps, pinpoint one part of the displayed image more precisely. In operation, mark 404 by user A has been updated to mark 406 by user B, mark 404 is no longer in the image. When user C viewed the booklet published by user B, user C felt it would be better if an additional mark was added to illustrate a point, thus a drawing mark 408 was added, resulting in this particular image with two marks now.

According to one embodiment, once a booklet is published, a copy thereof is retained at a server (e.g., the server 110 of FIG. 1A and 300 of FIG. 3). The published version may be completely overwritten by a viewer as a newly created booklet. If a version control is employed, the original version of the booklet may be recovered.

The invention is preferably implemented in software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for providing a booklet, the method comprising:
   displaying an image on a display screen of a computing device being used by a user;
   determining in the computing device if a microphone of the computing device is turned on;
   allowing the user to draw marks on the image being displayed, wherein the marks are superimposed on the image;
   capturing a complete progress of making the marks on the image by the user while creating an audio track to synchronize with the complete progress of making the marks, wherein the audio track records any commentary made by the user to accompany the complete progress of making the marks, wherein image is from a page, and said capturing a complete progress of making the marks on the image further comprises:
      duplicating the marks automatically in a number of following bodes, until another mark is made on a new page in the booklet while recording the audio track progressively from the pace to another in the following pages, so as to show a complete progress of making the marks throughout the following pages when the page and the following pages are shown sequentially;
   creating the booklet with a first version of the marks along with the audio track;
   playing back the audio track in entirety while showing the complete progress of the marks being made when the image is accessed, wherein some parts of the first version of the marks are locked up by the user and other parts of the first version of the marks are allowed to be updated by others to create a second version of the marks, both of the first and second versions of the marks are available to certain users to show when, how and by whom an update has been made to the booklet, a sign is further displayed to allow a recipient of the booklet to undo some or all modifications to the marks by a gesture command, and wherein said playing back the audio track in entirety further comprises:
      causing the computing device to vibrate or have a specifically displayed image in the booklet flash in order to catch attention of the user to the specifically displayed image by adding a sound from the computing device;
   allowing the booklet to be further edited by different users at different times to create different versions of the booklet; and
   creating a master copy of the booklet by assembling respective edits from the different users.

2. The method as recited in claim 1, wherein the marks are in different colors, sizes and forms selectable by the user.

3. The method as recited in claim 2, further comprising:
   updating some of the marks by another user to create updated marks, wherein the updated marks include at least a new mark added by the another user to the image;
   capturing a complete progress of making the updated marks on the image by the other user while adding another audio track to synchronize with the complete progress of making the updated marks, wherein the another audio track records any commentary made by the other user;
   updating the booklet to include the updated marks and the another audio track; and
   allowing a viewer to choose either one of the versions of the booklet.

4. The method as recited in claim 1, wherein the image is loaded from a photo library in the computing device.

5. The method as recited in claim 1, wherein the image is taken live with a camera provided on the computing device.

6. The method as recited in claim 1, wherein the image and the following pages are part of a video.

7. The method as recited in claim 6, wherein the computing device is a mobile device and the display screen is a touch-screen.

8. The method as recited in claim 1, further comprising:
   establishing a link with an account maintained at a social network when the user activates to publish the booklet to the social network; and
   uploading the booklet to a designated page of the social network.

9. The method as recited in claim 8, further comprising:
   capturing a profile of the account of the social network;
   determining an interest in accordance with the profile;
   embedding a link in the booklet when the booklet is transported to the social network; and loading an advertisement per the interest when the booklet is viewed.

10. The method as recited in claim 8, further comprising:
showing a list of contacts the user can communicate mutually on the social network;
determining which of the contacts the user has selected to receive the booklet; and
transporting the booklet to the social network when the selected contacts can see the booklet.

11. The method as recited in claim 10, further comprising showing a list of booklets on the display screen, wherein each of the booklets shows a brief profile to demonstrate that some of the booklets are originally authored by the user while others of the booklets are received from other users.

12. The method as recited in claim 10, wherein one of the booklets received from the other users includes another audio track added by the other user.

13. The method as recited in claim 10, wherein one of the booklets received from the other users includes an additional mark added by the other user.

14. A system for providing a booklet, the system comprising:
a server configured to receive registration information of a first user using a first computing device to create the booklet, wherein the server communicates with the first computing device configured to:
display an image in the booklet on a display screen;
determine if a microphone of the computing device is turned on;
allow the first user to draw marks on the image;
capture a progress of making the marks on the image by the first user while recording a spoken commentary by the first user to accompany the marks;
create the booklet with a first version of the image to include the marks and an audio track of the spoken commentary, wherein some of the marks are locked by the first user from further updating while other of the marks are allowed to be further updated by others,
and the server receives the booklet from the first computing device and posts the booklet on a page, a second user uses a second computing device to:
display the first version of the booklet;
show a sign to allow the second user to undo some or all modifications to the marks by a gesture command;
cause the second computing device to vibrate or have a specifically displayed image in the booklet flash in order to catch attention of the second user to the specifically displayed image by adding a sound from the computing device;
capture a progress of updating the other of the marks by the second user while recording a spoken commentary by the second user to create updated marks;
create the booklet with a second version to include the updated marks and an audio track of the spoken commentary by the second user while each of the updated marks is made, wherein the server receives the booklet from the second computing device and updates the booklet with the first and second versions to allow a viewer to view either one of the first and second versions of the booklet.

15. The system as recited in claim 14, wherein the mark or the updated mark is in different colors, sizes and forms selected by the first user or the second user.

16. The system as recited in claim 15, wherein the server is configured to control a plurality of registered users and determine how the booklet is created by the first user on the first computing device and updated by the second user on the second computing device.

17. The system as recited in claim 15, wherein the server is configured to capture an interest of each of the registered users and push one or more advertisements in accordance with the interest when the each of the registered users views the booklet.

18. The system as recited in claim 17, wherein the server is configured to obtain a copy of the booklet after the booklet is updated by another user.

19. A mobile device for providing a booklet, the mobile device comprising:
a display screen;
a microphone;
a memory space for storing an application module;
a processor, coupled to the memory space and the display screen; executing the application module to cause the mobile device to perform operations including:
receiving the booklet of a first version from another device, wherein the booklet includes at least one image with marks added thereon by a first user;
displaying a complete progress of how each of the marks is added by the first user while playing back an audio track synchronized with the complete progress of the marks in making by the first user;
showing a sign to allow a second user to undo some or all of the marks by a gesture command;
causing the mobile device to vibrate or have a specifically displayed image in the booklet flash in order to catch attention of the second user to the specifically displayed image by adding a sound;
allowing the second user to update some of the marks on the image while adding another audio track via the microphone to accompany a complete progress of how each of the some of the marks is updated, wherein other of the marks are locked up by the first user from being further updated, the some of the marks include a new mark added by the second user to the image;
capturing the complete progress of updating the some of the marks on the image while recording another audio track progressively while the some of the marks are being updated;
updating the booklet to have a second version to include the updated some of the marks and the another audio track; and
allowing a viewer to view either one of the first and second versions.

20. The mobile device as recited in claim 19, wherein the operations further include:
sending the updated booklet electronically to another device for viewing by others.

* * * * *